Sept. 22, 1953     R. K. ALLEN     2,653,258
ELECTRICAL CONDUCTOR LEAD FOR COMMUTATORS
Filed June 29, 1951
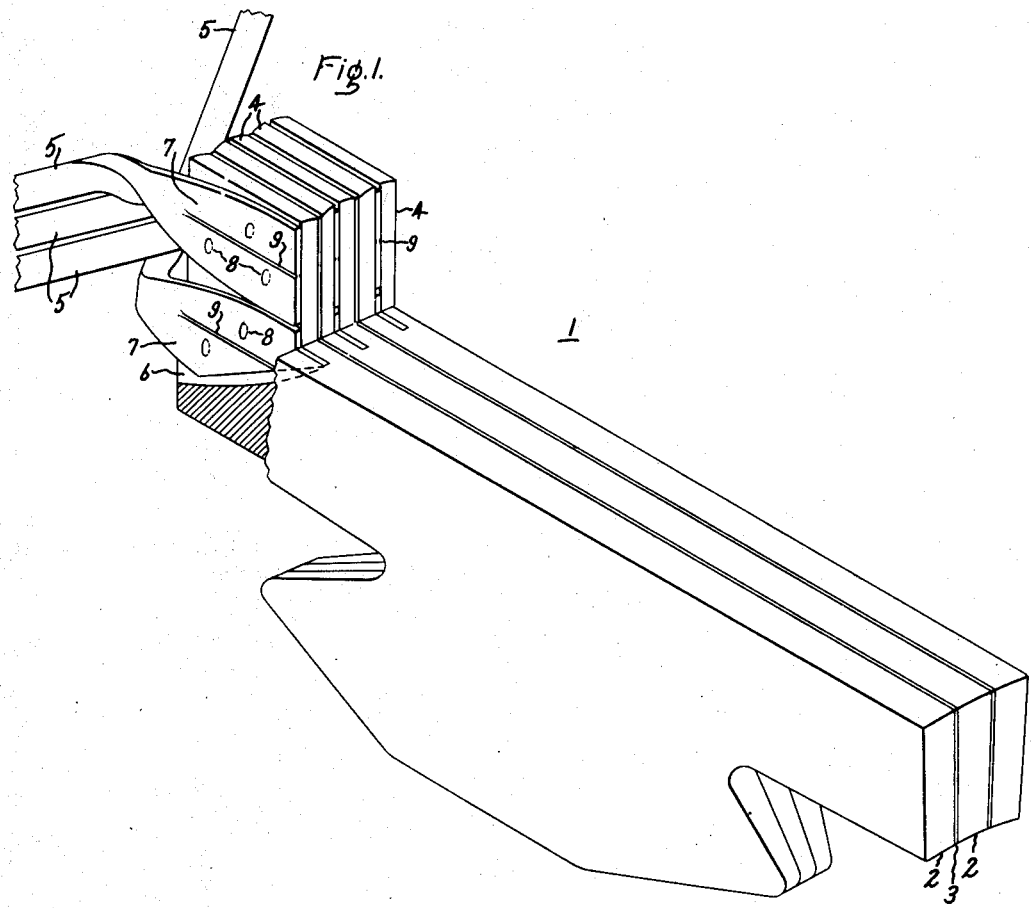
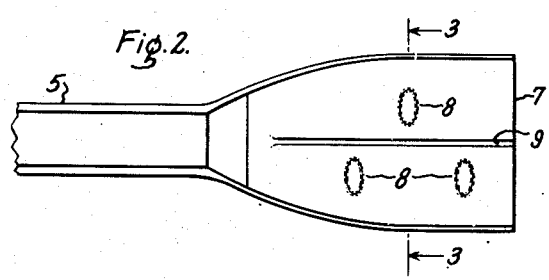
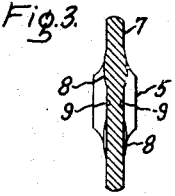
Inventor:
Robert K. Allen,
by *Ernest E. Britton*
His Attorney.

Patented Sept. 22, 1953

2,653,258

UNITED STATES PATENT OFFICE 2,653,258

ELECTRICAL CONDUCTOR LEAD FOR COMMUTATORS

Robert K. Allen, Wesleyville, Pa., assignor to General Electric Company, a corporation of New York Application June 29, 1951, Serial No. 234,325

12 Claims. (Cl. 310—234)

This invention relates to leads for electrical conductors and more particularly to armature leads for commutator-type dynamoelectric machines.

In the design of commutator-type dynamoelectric machines, particularly in the larger frame sizes, as for example traction motors, the armature leads are conventionally soldered to the commutator risers and it is particularly important that a good soldered connection be obtained in order to secure a joint with low electrical resistance and also that the leads may not become disconnected under the influence of the high centrifugal forces which may occur during certain conditions of operation. In the past, the armature leads have been driven into slots in the commutator risers, however, it has been found that the soldered connection may still be inadequate in that the solder does not penetrate the space between the lead and the walls of the slot in the riser.

It is, therefore, an object of this invention to provide an improved lead for an electrical conductor which may be driven into a slot in a connecting member, such as a commutator riser, and which will provide a relatively small air gap of controlled thickness between the surface of the lead and the walls of the slot so that optimum capillary action of the solder will be obtained, causing the solder to readily penetrate the air gap and produce a tight joint.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a lead for an electrical conductor is provided having a flattened end portion with a plurality of relative low projections formed thereon, as by embossing in the flattening operation. Thus, the lead can be driven into a slot in a connecting member, such as a commutator riser, with an air gap being defined between the surface of the lead end and the walls of the slot which can be penetrated by the solder under the influence of capillary action. Longitudinal grooves may additionally be formed in the surface of the lead end portion to guide the solder toward the base of the lead.

In the drawing, Fig. 1 is a fragmentary view, partly in section, of a commutator with armature leads constructed in accordance with this invention; Fig. 2 is a top view of the improved lead of this invention; and Fig. 3 is a cross sectional view taken along the line 3—3 of Fig. 2.

Referring now to Fig. 1, there is shown a portion of a commutator 1 having commutator bars or segments 2 separated by suitable insulation, such as mica 3. Each of the bars 2 is supplied with a riser 4 formed at one end thereof for making the connections to the armature leads 5. Each of the risers 4 has a longitudinal slot 6 milled or otherwise formed therein. The armature leads 5 are provided with flattened end portions 7 which are positioned in the slots 6 in the commutator risers 4, the end portions 7 being formed as will be hereinafter described.

Referring now to Figs. 2 and 3, the flattened end portions 7 of the leads 5 are provided with a plurality of relatively small low projections 8 formed on both sides thereof. These projections may be embossed in the flattening operation and relatively shallow longitudinal grooves 9 may also be formed in the flattening operation on both sides of the flattened end portion 7 extending substantially to the base thereof. It has been found that the embossed projections 8 should be on the order of .00175" high and that the slots 9 should be on the order of .010" deep.

It will now be readily apparent that the flattened end portions 7 of the leads 5 may be driven into the slots 6 of the commutator risers 4 with the projections 8 engaging the walls of the slot so as to establish a relatively thin air gap between the flat side surfaces of the flattened end portion 7 and the walls of the slots 6. Thus, during the soldering operation, the solder will penetrate this air gap by capillary action insuring a thorough and tight soldered connection. The provision of the longitudinal grooves 9 has been found to substantially reduce the high void area, normally found in the central portions of a solder joint. The solder follows the groove toward the base of the flattened portions 7 and then spreads laterally by capillary action. The groove not only provides an avenue of entry for the solder but also facilitates the escape of gas bubbles evolved from the flux. The provision of the embossed projections 8 thus providing an air gap for capillary action of the flux and solder has been found to permit the elimination of pre-tinning of the leads and it has been found sufficient to clean the lead ends in a nitric acid dip after which the lead ends are fluxed with, for example, a rosin flux and the armature then dip soldered. This improved lead construction has also been found desirable for use in connection with the improved flux and soldering method described in my copending application, Serial No. 236,195, filed July 11, 1951, assigned to the assignee of the present application, which discloses the use of a liquid flux formed of an aqueous solution of diethylamine-hydrochloride, and dip soldering with a lead-silver solder.

It will be readily apparent that this invention provides an improved lead for an electrical conductor which is to be soldered in a slot in a connecting member, for example, a commutator riser and it has been found that this construction provides greatly improved joints over the previously used flat pre-tinned leads. Soldered joints using untinned leads having the embossed projections of this invention with 2.5% silver— 97.5% lead solder, and pre-tinned flat leads with tin solder were shear tested to determine the relative strength of the joints. The results of these tests on the pre-tinned flat leads were extremely erratic and generally the fracture revealed a very high percentage of void area. The embossed leads, however, provided consistently good quality joints with a low percentage of void areas. The silver-lead solder was found to possess unexcelled strength at temperatures above 150° C. and at temperatures as high as 290° C. this solder possessed adequate strength by itself to prevent lifting of the coil leads without depending on the holding forces of the friction developed between the lead and the riser slot. The tin solder had insufficient strength above 210° C. to prevent this lifting and reliance must therefore be placed solely on the friction forces during periods of prolonged overload or inadequate cooling. The combination of the leads of this invention having embossed projections with the silver-lead solder provide joints of strength which can not be equaled by the conventional flat pre-tinned leads with tin solder and the permissible temperature rise is approximately 80° C. above that which can be withstood by the conventional leads with tin solder. In addition to the superior mechanical properties of the improved lead of this invention together with the silver-lead solder which alone involves an appreciable reduction in cost over the cost of tin solder, no pre-tinning and shimming is required and the need for repair soldering of armatures is practically eliminated except where re-winding is required due to insulation failure.

While I have illustrated and described a specific embodiment of this invention, further modifications and improvements will occur to those skilled in the art. I desire it to be understood therefore, that this invention is not limited to the particular form shown and I intend in the appended claims to cover all modifications which do not depart from the spirit and scope of this invention.

What I claim as new and desire to secure by Letters Patent of the United States is:

1. A lead for an electrical conductor having a flattened end portion with a relatively small projection formed in its surface so that an air gap is defined between said lead end portion surface and the walls of a slot in a connecting member when said lead end portion is driven into said slot whereby solder penetrates said air gaps by capillary action to provide a tight joint, said lead end portion having a longitudinal groove formed in its surface for guiding solder to the rear thereof.

2. A lead for an electrical conductor having a flattened end portion with a plurality of relatively small low projections formed on both sides thereof so that air gaps are defined between the surfaces of said lead end portion and the walls of a slot in a connecting member when said lead end portion is driven into said slot whereby solder penetrates said air gaps by capillary action to provide a tight joint, said lead end portion having relatively shallow longitudinal grooves formed on both sides thereof for guiding solder toward the rear of said lead end portion.

3. A lead for an electrical conductor having a flattened end portion with a plurality of relatively small low projections on the order of .00175" high formed on both sides thereof so that air gaps are defined between the surfaces of said lead end portion and the walls of a slot in a connecting member when said lead end portion is driven into said slot whereby solder penetrates said air gaps by capillary action to provide a tight joint, said lead end portion having relatively shallow longitudinal grooves on the order of .010" deep formed on both sides thereof for guiding solder toward the rear of said lead end portion.

4. In combination, a commutator having a plurality of bars each having a riser for making connections thereto with a longitudinal slot formed therein, and a plurality of electrical conductors having leads with flat end portions respectively driven into said riser slots, each of said flat end portions having a relatively small projection formed on at least one of its flat surfaces for engaging the adjacent wall of the slot so as to define air gaps respectively between said flat surfaces and the adjacent walls of said riser slots whereby solder penetrates said air gaps by capillary action to provide tight joints.

5. In combination, a commutator having a plurality of bars each having a riser for making connections thereto with a longitudinal slot formed therein, and a plurality of electrical conductors having leads with flat end portions respectively driven into said riser slots, each of said flat end portions having a plurality of relatively small projections formed on its surface for engaging the adjacent wall of the slot so as to define air gaps respectively between said flat end portion surfaces and the walls of said riser slots whereby solder penetrates said air gaps by capillary action to provide tight joints.

6. In combination, a commutator having a plurality of bars each having a riser for making connections thereto with a longitudinal slot formed therein, and a plurality of electrical conductors having leads with flat end portions respectively driven into said riser slots, each of said flat end portions having a plurality of relatively small low projections formed on both sides thereof for engaging the walls of the slot so as to define air gaps respectively between the flat surfaces of said lead end portions and the walls of said riser slots whereby solder penetrates said air gaps by capillary action to provide tight joints.

7. In combination, a commutator having a plurality of bars each having a riser for making connections thereto with a longitudinal slot formed therein, and a plurality of electrical conductors having leads with flat end portions respectively driven into said riser slots, each of said flat end portions having a plurality of relatively small low projections on the order of .00175" high formed on both sides thereof for engaging the walls of the slot so as to define air gaps respectively between the flat surfaces of said lead end portions and the walls of said riser slots whereby solder penetrates said air gaps by capillary action to provide tight joints.

8. In combination, a commutator having a plurality of bars each having a riser for making connections thereto with a longitudinal slot formed therein, and a plurality of electrical conductors having leads with flattened end portions respectively driven into said riser slots, each of said lead end portions having a relatively small projection formed on its surface so that air gaps are respectively defined between said lead end portion surfaces and the walls of said riser slots whereby solder penetrates said air gaps by capillary action to provide tight joints, said lead end portions respectively having longitudinal grooves formed therein for guiding solder toward the rear thereof.

9. In combination, a commutator having a plurality of bars each having a riser for making connections thereto with a longitudinal slot formed therein, and a plurality of electrical conductors having leads with flattened end portions respectively driven into said riser slots, each of said lead end portions having a plurality of relatively small low projections formed on both sides thereof so that air gaps are respectively defined between the surfaces of said lead end portions and the walls of said riser slots whereby solder penetrates said air gaps by capillary action to provide tight joints, said lead end portions respectively having relatively shallow longitudinal grooves formed in both sides thereof for guiding solder toward the rear thereof.

10. In combination, a commutator having a plurality of bars each having a riser for making connections thereto with a longitudinal slot formed therein, and a plurality of electrical conductors having leads with flattened end portions respectively driven into said riser slots, each of said lead end portions having a plurality of relatively small low projections on the order of .00175" formed on each side thereof so that air gaps are respectively defined between the surfaces of said lead end portions and the walls of said riser slots whereby solder penetrates said air gaps by capillary action to provide tight joints, said lead end portions respectively having relatively shallow longitudinal grooves in the order of .010" deep formed on both sides thereof for guiding solder toward the rear thereof.

11. A lead for an electric conductor provided with a flat end portion adapted to be driven into a slot in a connecting member and additionally secured by solder to an adjacent side wall of the slot, and a relatively small projection on the order of .00175" high on at least one flat side of said end portion for engaging the adjacent wall of the slot so as to establish an air gap between the flat surface of said side and the adjacent side wall of the slot to provide for the penetration of solder therebetween by capillary action.

12. A lead for an electric conductor comprising a flat end portion adapted to be driven into a slot in a connecting member and additionally secured by solder to the side walls of the slot, and a plurality of relatively small low projections on the order of .00175" high on each flat side of said end portion for engaging the walls of the slot so as to establish air gaps between the flat surfaces of said sides and the side walls of the slot to provide for the penetration of solder therebetween by capillary action.

ROBERT K. ALLEN.

References Cited in the file of this patent

UNITED STATES PATENTS

| Number | Name | Date |
|---|---|---|
| 1,219,228 | Birdsall | Mar. 13, 1917 |
| 1,445,885 | Hix | Feb. 20, 1923 |

FOREIGN PATENTS

| Number | Country | Date |
|---|---|---|
| 476,513 | Great Britain | Dec. 10, 1937 |